United States Patent Office 3,525,731
Patented Aug. 25, 1970

3,525,731

PROCESS FOR THE ISOLATION OF STAPHYLOCOCCI-ENTEROTOXIN FROM FOODSTUFFS

Iwan Milanow Stojanow, Berlin-Pankow, and Elly Gertrud Schenk, Oranienburg, near Berlin, Germany, assignors to Institut fur Milchforschung Oranienburg, Sachsenhausener, near Berlin, Germany No Drawing. Filed June 7, 1966, Ser. No. 555,708
Int. Cl. A61k *23/00*
U.S. Cl. 260—112 6 Claims

ABSTRACT OF THE DISCLOSURE

Enterotoxin in foodstuff may be qualitatively or quantitatively determined after extraction of the foodstuff specimen with pH adjustment to approximately 4, heating the resultant extract, precipitation of the ballast material from the extract and removal thereof by centrifugation, cooling the supernatant liquid to solidify fat, centrifuging the supernatant liquid, dialyzing and gel concentrating the supernatant liquid, passing the supernatant through a molecular sieve to obtain pure enterotoxin and reconcentrating the enterotoxin.

The present invention relates to the isolation of staphylococci-enterotoxin from various foodstuffs for performing the detection of the enterotoxin.

Methods for the isolation of staphylococci-enterotoxin are already known. One of these consists in the extraction with water or sodium chloride solution of suspected foodstuffs and subsequent centrifugation of the extract. Another one of the known methods comprises buffer extraction and double filtration through Whatmann filter No. 42 in vacuo with addition of $CHCl_3$, dialysis, and concentration with polyvinyl pyrrolidone, decantation, and heating, as well as centrifugation, of the supernatant liquid, renewed addition of $CHCl_3$ and centrifugation. The entire process of isolation takes up to five days depending on the type of foodstuff.

The known methods yield an extract which contains in addition to staphylococci-enterotoxin protein having a molecular weight of 24,000±3,000 and other undesirable components e.g. polypeptides, carbohydrates, fats, seasoning, etc., whereby the biological detection of staphylococci-enterotoxin is made considerably more difficult, if not impossible. Moreover, the known processes are too expensive and the value of the methods is impaired by the required period of 4–5 days for their completion.

It is the object of the present invention to provide a method which makes it possible to reduce the necessary time to a few hours; furthermore, to provide a method by which it is possible to obtain the staphylococci-enterotoxin in comparatively pure state, whereby the detection of staphylococci-enterotoxin in foodstuff is rendered reliable in qualitative as well as quantitative respect.

Other objects and advantages of the method according to the invention will become apparent from the following detailed description.

According to the invention, buffer extraction of foodstuffs is used followed by gel concentration, filtration thereof, and gel reconcentration to achieve a complete separation of staphyloccocci-enterotoxin which is a protein, from the other components of the foodstuff.

The buffer extraction serving for the isolation of the staphylococci-enterotoxin is carried out with $$Na_2HPO_4 \cdot 12H_2O$$

in a pH-range of 4.0–7.5; the buffer extract is heated to 80–100° C. for a period of 30–60 minutes, followed by acid precipitation by means of Esbach's reagent added to the specimen in the ratio 1:2, and subsequent centrifugation. The so obtained extract is kept standing for one hour, then rendered fat-free at 4° C., adjusted to a pH of 5.0 to 7.0 with NaOH and centrifuged for about 20 minutes at 10,000 r.p.m.

The supernatant, yellowish liquid is subjected to a rapid gel concentration by known means, e.g. by Bio Gel P–10, a polyacrylamide powder of highly porous particles of very small size, which is water-binding and rapidly swells in water or an aqueous buffer solution and which is marketed by "Calbiochem," a California corporation for biochemical research, until a five-to-ten-fold concentration is obtained. The use of a gel bed with a suitable gel e.g. dextran or a synthetic polymer as molecular sieve results in the separation of enterotoxin free of accompanying substances. For the purpose of reconcentration, the fractions are concentrated with a gel, which may again be dextran for instance Sephadex or a synthetic polymer, with renewed five-to-ten-fold concentration.

The technical and economical advantages of the method according to the invention reside in the possibility of performing the isolation of staphylococci-enterotoxin from foodstuffs in a short time and with exact detection of enterotoxin which may be done qualitatively by ring test precipitation—a testing method known in this art, which results in formation of a ring—and quantitatively by sperm test, at any time before the foodstuff is made available for consumption, thus preventing the public from intake of contaminated food and avoiding considerable losses to the public economy.

In the following, an example will be given for illustrating the invention more fully, but it should be understood that many changes can be made in the details without departing from the spirit of the invention.

The example will explain the essential steps of the method for isolating staphylococci-enterotoxin as follows:

FIRST STEP.—CONCENTRATION OR EXTRACTION OF SPECIMEN WITH pH ADJUSTMENT

The specimen is concentrated and, if in liquid state, such as milk, adjusted in this natural state with 3 N HCl to approximately pH 4.0. When the specimen is solid, an extract is made with buffer solution $Na2HPO_4 \cdot 12H_2O$ (0.02 mol) and that is adjusted to approximately pH 4.0.

SECOND STEP.—HEATING

The extract is heated for 30 minutes to about 85° C., it is then cooled before the next step.

THIRD STEP.—ACID PRECIPITATION AND CENTRIFUGATION

The ballast material is precipitated with Esbach's Reagent, 1 part of reagent for 2 parts of extract. Esbach's reagent is an aqueous acid solution constituted of 10 g. of picric acid and 20 g. of citric acid per 1000 g. of ion-free water. The reaction time is 30 minutes. Subsequently, centrifugation is effected for 30 minutes at 3000 r.p.m., with the result being a clear to slightly turbid liquid.

FOURTH STEP.—REMOVAL OF FAT

After having been allowed to stand at 4° C. in a refrigerator for one hour, the solidified layer of fat is removed from the top, and the separated liquid goes to further centrifugation.

FIFTH STEP.—SECOND CENTRIFUGATION

The test specimen is adjusted to pH 6.8 by means of 1 N NaOH and centrifuged for about 20 to 30 minutes at r.p.m. 10,000.

SIXTH STEP.—DIALYSIS AND CONCENTRATION

The supernatant yellow liquid is decanted, subjected to dialysis through a gel substance (dextran or a synthetic polymer) and concentrated by Bio Gel P-10 (polyacrylamide).

After a period of 20 minutes, the desired concentration is obtained; it can be calculated according to directions printed on the label of the dealer firm. After another centrifugation for 30 minutes at 10,000 r.p.m., the supernatant liquid is withdrawn and passed to gel filtration.

SEVENTH STEP.—GEL FILTRATION

The liquid, 10–20 ml., is passed through a chromatographic column charged with Sephadex G-100 or G-50 which are three-dimensional polysacharride lattices produced by cross-linking linear dextran molecules or Bio-Gel P-60 or P-100, which are polyacrylamides of the type hereinabove described with reference to Bio-Gel P-10. The then occurring purification and elution of the enterotoxin is performed with 0.02 mol disodium phosphate buffer solution ($Na_2HPO_4 \cdot 12H_2O$) at pH 6.8. After a first run of the buffer solution has passed through, the collector of fractions of the passing liquid is attached. Since enterotoxin runs off almost immediately before the dye, it is possible to have a visual indication when to attach the collector. When the column is properly charged and the liquid is well buffered, it is possible exactly to determine the enterotoxin in the specimens.

The specimens taken from the collector of fractions are further processed by reconcentration.

EIGHTH STEP.—RECONCENTRATION

The specimens withdrawn from the collector undergo reconcentration with Bio Gel P-10 as described in the above concentration, until the liquid is brought down to one fifth–one tenth of its volume. The supernatant liquid obtained in this reconcentration will now contain enterotoxin in a form which can be used for qualitative and quantitative determination.

The entire process can be carried out in 8 to 9 hours.

The molecular sieves referred to above by trade name are briefly characterizable as follows:

| Molecular sieve | Particle size | Molecular weight of molecules separated |
|---|---|---|
| Sephadex G-50 (fine) | 20–80μ | 1,500–30,000 |
| Sephadex G-100 | 40–120μ | 4,000–150,000 |
| Bio Gel P-10 | 50–150 or 50–100 mesh | 5,000–17,000 |
| Bio Gel P-60 | 50–150 or 50–100 mesh | 30,000–70,000 |
| Bio Gel P-10° | 50–100 mesh | 40,000–100,000 |

While the foregoing example illustrates the process with its several steps for obtaining the enterotoxin in a manner adapted for exact determination, it should be understood that the example is given by way of illustration and not of limitation, and that many changes in the details may be made without departing from the spirit of the invention.

What is claimed is:
1. A process for isolation of staphylococci-enterotoxin from a specimen of a foodstuff for carrying out the quantitative determination of the enterotoxin which comprises the steps of
   (a) buffer extraction of the specimen with pH adjustment to a range of about 4 to 7.5;
   (b) heating the resultant extract to 80 to 100° C. for 30 to 60 minutes;
   (c) precipitating the ballast material from the extract by adding to the extract an aqueous acid solution constituted of 1% by picric acid and 2% citric acid and removing the ballast material by centrifuging;
   (d) cooling the supernatant liquid to about 4° C. for eliminating the fat contained in the specimen by solidification;
   (e) subjecting the supernatant liquid to renewed centrifugation after adjusting the pH thereof to about 5 to 7;
   (f) subjecting the supernatant liquid to dialysis through a gel substance and gel concentration;
   (g) passing the concentrated supernatant liquid through a chromatographic column which adsorbs the enterotoxin and eluting pure enterotoxin from the column by means of a buffer solution having a pH of 6.8; and
   (h) subjecting the pure enterotoxin to reconcentration.

2. The process of claim 1, wherein in step (c) the aqueous acid solution is employed in the ratio of one part of said solution for two parts of the extract and the centrifugation is effected for 30 minutes at 3,000 r.p.m.

3. The process of claim 1, wherein the renewed centrifugation of step (e) is done for 20 minutes at r.p.m. 10,000.

4. The process of claim 1 wherein the dialysis is carried out through a cross-link dextran gel and the gel concentration is effected by a highly porous polyacrylamide.

5. The process of claim 1 wherein the chromatographic column is charged with a cross-linked dextran gel or a highly porous polyacrylamide.

6. The process of claim 1 wherein the reconcentration of step (h) is carried out on a highly porous polyacrylamide until the liquid is concentrated to ⅕ to ⅒ of its volume.

References Cited

Read, J. of Dairy Sci., vol. 48, April 1965, pp. 420–424.
Casman Applied Micro, vol. 11, 1963, pp. 498–499.
Casman Applied Micro, vol. 13, March 1965, pp. 181–189.
Chem. Abs., vol. 65, pp. 17241–2.

ALBERT T. MEYERS, Primary Examiner
A. P. FAGELSON, Assistant Examiner

U.S. Cl. X.R.

424—2, 12, 92